(12) United States Patent
Kimura et al.

(10) Patent No.: US 7,889,158 B2
(45) Date of Patent: Feb. 15, 2011

(54) ELECTROOPTIC DEVICE AND ELECTRONIC DEVICE

(75) Inventors: Fusashi Kimura, Matsumoto (JP); Masaki Takahashi, Shiojiri (JP)

(73) Assignee: Sony Corporation, Tokyo (JP)

(*) Notice: Subject to any disclaimer, the term of this patent is extended or adjusted under 35 U.S.C. 154(b) by 987 days.

(21) Appl. No.: 11/714,740

(22) Filed: Mar. 7, 2007

(65) Prior Publication Data
US 2007/0222742 A1 Sep. 27, 2007

(30) Foreign Application Priority Data
Mar. 24, 2006 (JP) ............... 2006-082404
Nov. 6, 2006 (JP) ............... 2006-300362

(51) Int. Cl.
*G09G 3/30* (2006.01)
*G09G 3/36* (2006.01)

(52) U.S. Cl. ............... 345/77; 345/76; 345/87

(58) Field of Classification Search ............... 345/36, 345/45, 76–81, 87–111; 315/169.3
See application file for complete search history.

(56) References Cited

FOREIGN PATENT DOCUMENTS

| JP | A 2003-207801 | 7/2003 |
|----|---------------|--------|
| JP | A 2004-94098  | 3/2004 |

*Primary Examiner*—Srilakshmi K Kumar
(74) *Attorney, Agent, or Firm*—K&L Gates LLP

(57) ABSTRACT

An electrooptic device includes: a first panel; a second panel on the back of the first panel; a first receiver circuit that measures a first ambient light incident on the first panel; a second receiver circuit that measures a second ambient light incident on the second panel; and a control circuit that measures the brightness of the environment where the first panel is placed on the basis of the luminance of the first ambient light whose ratio to that of the second ambient light is at or below a predetermined value, and that controls the display state of an image displayed on the first panel on the basis the brightness of the environment.

16 Claims, 8 Drawing Sheets

ELECTROOPTIC DEVICE AND ELECTRONIC DEVICE

The entire disclosure of Japanese Patent Application Nos. 2006-082404, filed Mar. 24, 2006 and 2006-300362, filed Nov. 6, 2006 are expressly incorporated by reference herein.

BACKGROUND

1. Technical Field

The present invention relates to an electrooptic device and an electronic device.

2. Related Art

Generally, liquid crystal devices include a liquid crystal panel and a back light which is a lighting system provided on the back of the liquid crystal panel. A liquid crystal device of a double-sided display type which has two liquid crystal panels, a main panel and a sub panel, on both sides of the back light is proposed as a display of a mobile phone (for example, refer to JP-A-2003-207801). This type of liquid crystal device displays an image by illuminating a liquid crystal panel by a back light from the back to obtain transmission light from the front. Therefore, it is sensitive to the brightness of surrounding environment, and the visibility of an image may change a lot depending on the environment. Thus, in order to obtain an appropriate display irrespective of surrounding brightness, a liquid crystal device having a photosensor for measuring external brightness (ambient light), and which controls the display state of an image on the basis of the measurement is proposed (for example, refer to JP-A-2004-94098).

Known methods for controlling the display state of an image include a method of controlling the luminance of a back light. However, since only two states, "dark" and "bright" can be sensed by the known control method, it has been insufficient to control the back light.

For example, outdoors in the daytime or indoors in which a fluorescent light is off, it is always determined to be "bright". Accordingly, the back light was too bright or too dark depending on the place. Moreover insufficient control of the back light affects the endurance of a battery for driving the back light. Thus, controlling the luminance of the back light in two or more levels according to the luminance of ambient light is examined.

Human visibility changes more sensitively in a dark environment than in a bright environment. Therefore, fine control of the back light in an indoor environment which is illuminated by a fluorescent light is effective in improving the visibility and reducing power consumption. In an indoor environment illuminated by a fluorescent light, the luminance of ambient light varies depending on the distance from the fluorescent light. For example, light detected in an outdoor environment is uniform because reflected sun light is sensed. Accordingly, when the luminance of ambient light is measured by a photosensor, the brightness of environment that human senses, i.e., an average luminance of ambient light can be measured. However, in an indoor environment illuminated by a fluorescent light, the photosensor detects light from the fluorescent light directly. Therefore, the measured luminance of ambient light varies greatly with the distance from the fluorescent light. Therefore, even if the photosensor measures the luminance of ambient light as it is, the photosensor cannot measure an average brightness that human senses. Thus, if disagreement arises between the luminance of ambient light measured by the photosensor and the brightness of the environment that human senses, the back light may be too bright or too dark depending on the place.

Thus, in controlling the luminance of the back light, it is important to measure correctly the brightness of environment used as the reference for the control. The brightness of environment that human senses is average environmental brightness. Therefore, in measuring environmental brightness by a photosensor, it is necessary to calculate the average value of the data of ambient light obtained. However, the data of ambient light varies widely. Therefore, if the average value of all the data is calculated, disagreement may be produced between the average value and the brightness that human senses. For example, the measured luminance of ambient light increases discontinuously just under a fluorescent light. Therefore, if the data of ambient light measured at such a place is included, the average value of the data will be increased, and disagreement will be produced between the average value and the brightness that human senses. Therefore, when the user moves in a passage in which a fluorescent light is installed, the luminance of the back light becomes so strong near the fluorescent light that the back light may sometimes blink during the movement.

SUMMARY

An advantage of some aspects of the invention is to provide an electrooptic device and an electronic device that can measure environmental brightness correctly in indoor environment illuminated by a fluorescent light, thereby allowing the display state of an image to be controlled appropriately.

An electrooptic device according to a first aspect of the invention comprises: a first panel; a second panel on the back of the first panel; a first receiver circuit that measures a first ambient light incident on the first panel; a second receiver circuit that measures a second ambient light incident on the second panel; and a control circuit that measures the brightness of the environment where the first panel is placed on the basis of the luminance of the first ambient light whose ratio to that of the second ambient light is at or below a predetermined value, and that controls the display state of an image displayed on the first panel on the basis the brightness of the environment.

As described above, the greatest obstacle in measuring environmental brightness is the data of ambient light measured when the first panel is located just under a fluorescent light (artificial light source). Therefore, environmental brightness can be correctly measured when such data is excluded. Here, it cannot be determined whether the first panel is located just under a fluorescent light only by the first receiver circuit provided to the first panel. This is because the luminance of ambient light measured changes with the distance from the fluorescent light or the luminance of the fluorescent light itself. Therefore, it is determined whether the first panel is located just under a fluorescent light by using both the first receiver circuit and the second receiver circuit disposed on the back.

The electrooptic device of the double-sided display type which includes the first panel and the second panel like the electrooptic device according to some aspects of the invention can be provided with a receiver circuit in both of the first panel and the second panel. Therefore, the good use of the data of ambient light measured by these receiver circuits makes it possible to determine easily the positional relationship between the first panel and the fluorescent light (ambient light). For example, when the first panel is located except just under a fluorescent light, the ambient light reflected by the ground enters the second receiver circuit. Therefore, the luminance of the ambient light measured by the second receiver circuit does not become extremely smaller than the luminance of the ambient light measured by the first receiver circuit. In contrast, when the first panel is located just under a fluorescent light, the reflected light from the ground hardly enters the second receiver circuit. Therefore, the luminance of ambient light measured by the second receiver circuit becomes extremely smaller than the luminance of ambient light measured by the first receiver circuit. Accordingly, by comparing the data of the ambient light measured by the first receiver circuit and the second receiver circuit, it can be determined easily whether the data of the ambient light is measured just under a fluorescent light (a position where the second panel is against the ambient light).

Thus, in this case, the data of ambient light to be excluded is selected appropriately by grasping the positional relationship between the first panel and the fluorescent light using both the first receiver circuit and the second receiver circuit. This allows measurement of environmental brightness closer to that sensed by humans than the known devices. Since the display state of an image is controlled finely on the basis of the brightness of environment measured in this way, an electrooptic device with higher visibility and lower power consumption than known devices can be provided.

An electrooptic device according to a second aspect of the invention comprises: a display panel having a predetermined display surface; a first receiver circuit that measures a first ambient light incident on the display surface of the display panel; a second receiver circuit that measures a second ambient light incident on the surface of the display panel opposite to the display surface; and a control circuit that measures the brightness of the environment where the display panel is placed on the basis of the luminance of the first ambient light whose ratio to that of the second ambient light is at or below a predetermined value, and that controls the display state of an image displayed on the display panel on the basis the brightness of the environment.

With this structure, the data of ambient light to be excluded is selected appropriately by grasping the positional relationship between the first panel and the fluorescent light using both the first receiver circuit and the second receiver circuit. This allows measurement of environmental brightness closer to that sensed by humans than the known devices. Since the display state of an image is controlled finely on the basis of the brightness of environment measured in this way, an electrooptic device with higher visibility and lower power consumption than known devices can be provided. The electrooptic device according to the first aspect of the invention is a double-sided display electrooptic device having a first panel and a second panel. However, a technical idea of the invention is to grasp the positional relationship between the display panel and the fluorescent light to thereby appropriately select the data of ambient light to be excluded by comparing the first ambient light incident from the display surface with the second ambient light incident from the opposite side. Accordingly, the control method of the invention can be applied also to an electrooptic device having only one display panel provided that it can measure the ambient light on the display surface and the opposite surface. The electrooptic device according to the second aspect is an electrooptic device having such a single display panel.

Preferably, the predetermined value is 10 to 1. With this structure, a position against light can be detected more easily without complicated control.

Preferably, the control circuit controls the display state of the image at three levels or more according to the brightness of the environment. With this structure, the display state of an image can be controlled at levels. Therefore, the display state of the image does not change with slight changes in brightness. Therefore, an electrooptic device with higher visibility can be offered in comparison with the case where the display state of an image is controlled continuously. The fine control of the display state is effective also for reducing power consumption.

Preferably, the control circuit controls the display state of the image at two levels or more in the range from 100 lux to 1,000 lux. With this structure, good visibility is acquired in indoor environment (100 lux to 1,000 lux). Human visibility changes a lot in dark indoor environment rather than in bright outside environment. For example, when controlling the display state with a back light, slight changes of the luminance of the back light are not sensed in bright outdoor environment; however, slight changes of the luminance of the back light in dark indoor environment can be sensed, and has big influence on human visibility. In this case, the display state is controlled finely in the range of brightness (100 lux to 1,000 lux) at which human vision works sensitively. Accordingly, an electrooptic device of higher visibility than the known devices can be offered.

Preferably, the electrooptic device further comprises a lighting system that emits illumination light from the opposite side of the display surface, and the control circuit controls the luminance of the illumination light on the basis of the brightness of the environment. This structure allows the most suitable control according to environmental brightness. Although there are other methods for controlling the display state of an image such as a method of controlling the gray level of an image, such methods have the disadvantages of needing complicated control and changing the image itself. In contrast, the method of controlling the luminance of illumination light has not such disadvantages, which compensates environmental brightness with the brightness of an image. Thus, this is the most effective and direct method for coping with changes in environmental brightness. However, in the case of electrooptic devices which do not need a lighting system, such as an organic electroluminescence (EL) device, the display state of an image may be controlled by controlling the gray level of the image on the basis of environmental brightness.

An electronic device according to a third aspect of the invention comprises the foregoing electrooptic device. With this structure, environmental brightness can be measured correctly particularly in the indoor environment illuminated by a fluorescent light. Thus, an electronic device that can suitably control the display state of an image is offered.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Overall Structure of Electrooptic Device

Figure 1:
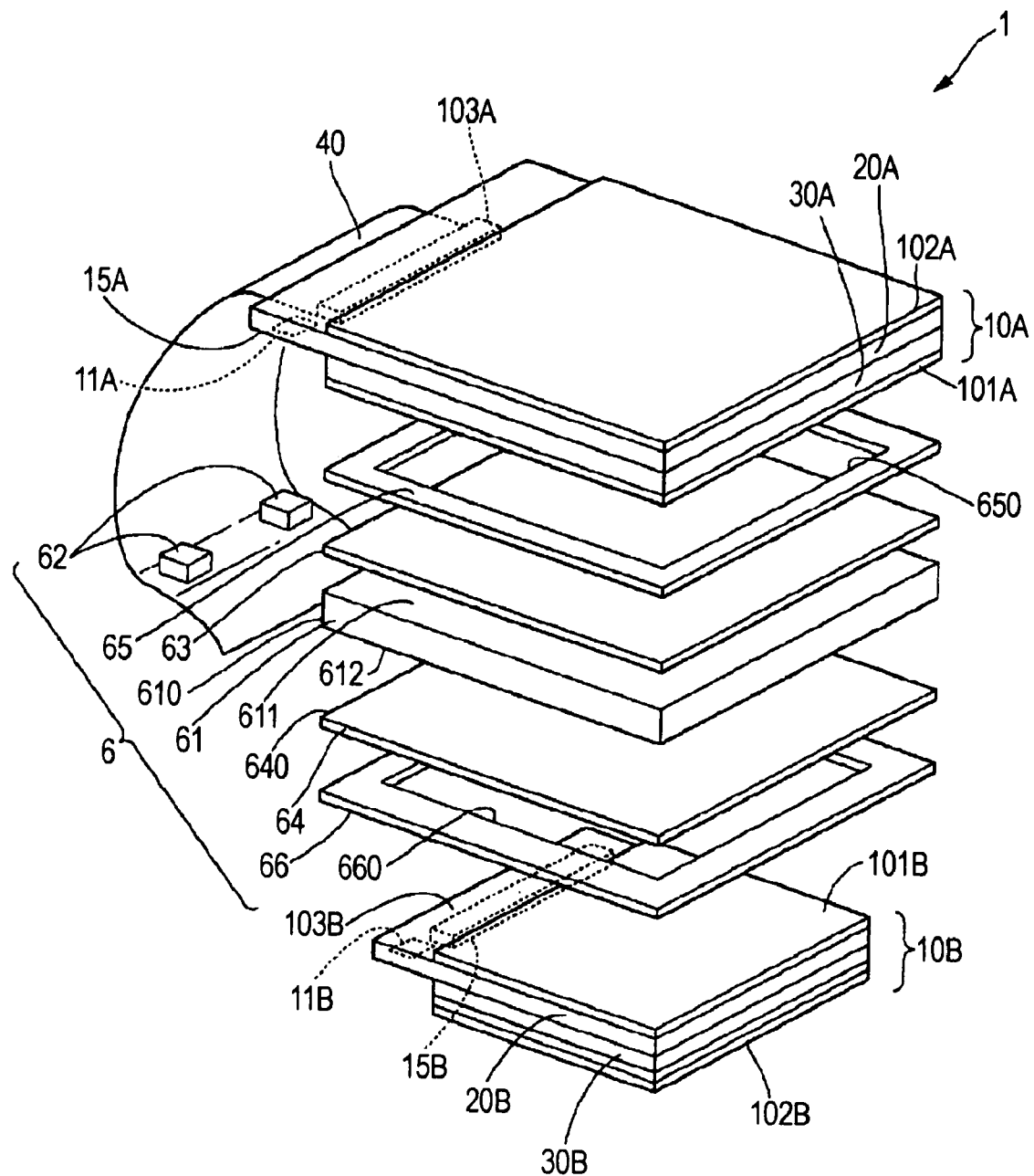
FIG. 1 is an exploded perspective view showing the structure of an electrooptic device according to a first embodiment of the invention.

FIG. 1 is an exploded perspective view showing the structure of an electrooptic device 1 according to an embodiment of the invention. As shown in FIG. 1, the electrooptic device 1 of this embodiment includes a first panel 10A, a second panel 10B disposed on the back of the first panel 10A, and a back light unit 6 which is a lighting system disposed between a pair of the first panel 10A and the second panel 10B, for illuminating them.

The first panel 10A and the second panel 10B are active-matrix transmissive or transflective electrochromatic liquid crystal display panels formed of nematic liquid crystal, such as a nonluminescent panel, for example. A light-incident side polarizer 101A and a light-exiting side polarizer 102A are laminated on both sides of the first panel 10A. The second panel 10A also has a light-incident side polarizer 101B and a light-exiting side polarizer 102B on both sides thereof. The first panel 10A constitutes a main liquid crystal display section (main panel), which is larger than the second panel 10B. On the other hand, the second panel 10B constitutes a substitute liquid crystal display section (subpanel), which is smaller than the first panel 10A.

The first panel 10A includes a device substrate 20A having picture electrodes and TFT elements which are pixel switching elements, and an opposed substrate 30A having opposed electrodes, a color filter, etc. These substrates 20A and 30A are bonded together by a seal material with a predetermined gap, between which a liquid crystal layer is enclosed. The device substrate 20A is larger than the opposed substrate 30A. An overhanging area 15A of the device substrate 20A projects out of the opposed substrate 30A, on which a drive circuit 103A including a semiconductor IC etc. is mounted by a chip on glass (COG) technique. A first receiver circuit 11A which is a photosensor is provided near the drive circuit 103A. A rim of a flexible board 40 which transfers signals or power between the drive circuit 103A and the first receiver circuit 11A is mounted to the overhanging area 15A.

The second panel 10B also includes a device substrate 20B having picture electrodes, TFT elements, etc., and an opposed substrate 30B having opposed electrodes, a color filter, etc., like the first panel 10A. The substrates 20B and 30B are bonded together by a seal material with a predetermined gap, between which a liquid crystal layer is enclosed. The device substrate 20B is larger than the opposed substrate 30B. An overhanging area 15B projects out of the opposed substrate 30B, on which a drive circuit 103B including a semiconductor IC etc. is mounted by COG. A second receiver circuit 11B which is a photosensor is provided near the drive circuit 103B. A flexible board (not shown) which transfers signals and power between the drive circuit 103B and the second receiver circuit 11B is mounted to the overhang area 15B. Although a device that adopts COG technique is illustrated in this embodiment, a flexible substrate mounted with the drive IC by a chip on film (COF) technique may be mounted on a liquid crystal panel.

The first panel 10A and the second panel 10B are disposed back to back on both sides of the back light unit 6. The first panel 10A is opposed to a first surface 611 of a light guide 61 of the back light unit 6, and the second panel 10B is opposed to a second surface 612 of the light guide 61. Both the first panel 10A and the second panel 10B are illuminated by the illumination light emitted from the light guide 61 to the first surface 611 and the second surface 612.

The back light unit 6 includes a plurality of light emitting elements (LEDs) 62 serving as light source, and the light guide 61. The light emitted from the LEDs 62 enters the light guide 61 through a side face 610 and exits from the first surface 611 and the second surface 612.

The light guide 61 is made of a light transmissive resin molding. A first-panel-side prism sheet 63 with a thickness of, e.g., 100 μm is opposed to the first surface 611 of the light guide 61. Between the first-panel-side prism sheet 63 and the first panel 10A, a first-panel-side light-shielding sheet 65 which has an opening 650 in a region corresponding to the image display region of the first panel 10A is stacked. Similarly, a second-panel-side prism sheet 64 with a thickness of, e.g., 100 μm is opposed to the second surface 612 of the light guide 61. Between the second-panel-side prism sheet 64 and the second panel 10B, a second-panel-side light-shielding sheet 66 which has an opening 660 in a region corresponding to the image display region of the second panel 10B is laminated.

The first-panel-side prism sheet 63 allows part of the light exiting from the first surface 611 of the light guide 61 to pass through to the first panel 10A, and reflects the remaining light toward the light guide 61. The second-panel-side prism sheet 64 allows part of the light exiting from the second surface 612 of the light guide 61 to pass through to the second panel 10B, and reflects the remaining light toward the light guide 61. The light-shielding sheets 65 and 66 prevent a leak of light, which may be a two-layer sheet of black and white, a two-layer sheet of silver and black, a white sheet, or a transparent sheet, and which have a thickness of 50 μm, for example. The image display region is for displaying an image to a user, which is specified by the frame window of an electronic device and which substantially overlaps with the regions specified by the openings 650 and 660.

The LEDs 62 are mounted on the flexible board 40 (light-emitting-element mounting board) for supplying signals and power to the first panel 10A. The flexible board 40 is taken from the first panel 10A to the second surface 612 of the light guide 61, where the part next to the region where the LEDs 62 are mounted is pressure-fixed to an end of the second surface 612 by a board fixing member (not shown). The rim of the flexible board 40 is fixed onto the second surface 612 and as such, the LEDs 62 are positioned with the optical axis L directed to the side face 610 of the light guide 61.

Display Operation of Electrooptic Device

In the electrooptic device 1, the light emitted from the LEDs 62 enters the light guide 61 through the side face 610, and advances to the opposite side face. Since the second-panel-side prism sheet 64 is disposed on the second surface 612 of the light guide 61, part of the light which advances in the light guide 61 exits from the first surface 611 toward the first panel 10A by the second-panel-side prism sheet 64, and is modulated while passing through the first panel 10A, and this light forms an image. Since the first-panel-side prism sheet 63 is disposed on the first surface 611 of the light guide 61, part of the light which advances in the light guide 61 exits from the second surface 612 toward the second panel 10B by the first-panel-side prism sheet 63, and is modulated while passing through the second panel 10B, and this light forms an image.

The display state of the first panel 10A and the second panel 10B is controlled alternatively by a main controller to be described later, for example. That is, when displaying by the first panel 10A, the display of the second panel 10B is turned off, and when displaying by the second panel 10B, the display of the first panel 10A is turned off. When displaying by the first panel 10A, the luminance of the illumination light of the back light unit 6 is controlled on the basis of the brightness of environment measured by the first receiver circuit 11A, thereby achieving a display state suitable for the brightness of the environment where the first panel 10A is placed. When displaying by the second panel 10B, the luminance of the illumination light of the back light unit 6 is controlled on the basis of the brightness of environment measured by the second receiver circuit 11B, thereby achieving a display state suitable for the brightness of the environment where the second panel 10B is placed.

Electrical Structure of Electrooptic Device

Figure 2:
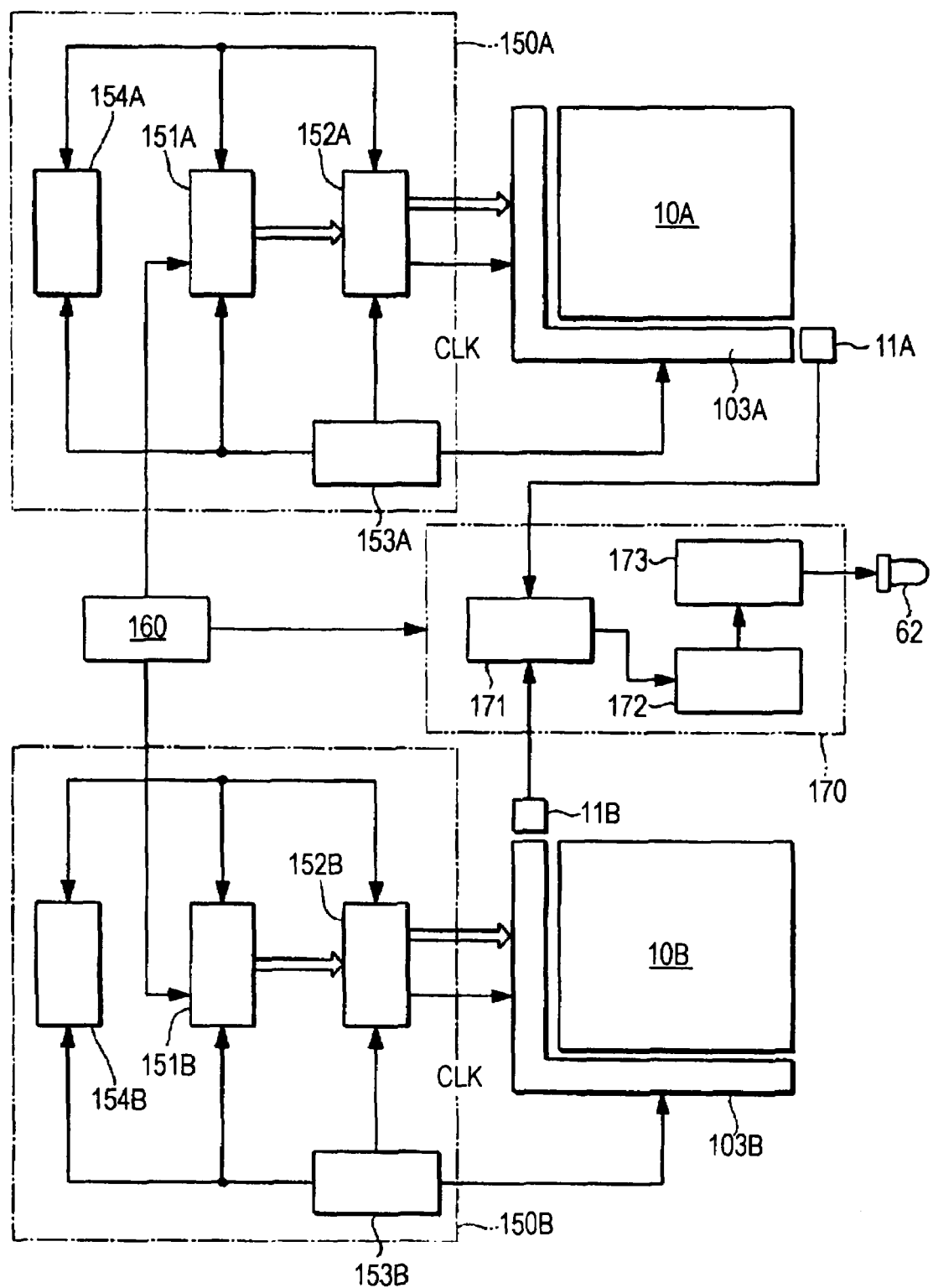
FIG. 2 is a block diagram showing the electrical structure of the electrooptic device.

FIG. 2 is a block diagram showing the electrical structure of the electrooptic device 1. As shown in FIG. 2, the electrooptic device 1 includes a first control circuit 150A which controls the first panel 10A, a second control circuit 150B which controls the second panel 10B, a third control circuit 170 which controls the light sources (LEDs) 62, the first receiver circuit 11A which detects an ambient light (first ambient light) incident on the first panel 10A, and the second receiver circuit 11B which detects an ambient light (second ambient light) incident on the second panel 10B. The first control circuit 150A, the second control circuit 150B, and the third control circuit 170 are controlled by the main controller 160 configured of a microcomputer etc.

The first panel 10A is connected to the drive circuit 103A. The drive circuit 103A is connected to the first control circuit 150A. The first control circuit 150A includes a display-information output source 151A, a display-information processing circuit 152A, a power supply circuit 153A, and a timing generator 154A. The second panel 10B is connected to the drive circuit 103B. The drive circuit 103B is connected to the second control circuit 150B. The second control circuit 150B includes a display-information output source 151B, a display-information processing circuit 152B, a power supply circuit 153B, and a timing generator 154B.

The display-information output sources 151A and 151B A each include a memory such as a read-only memory (ROM) or a random-access memory (RAM), a storage unit such as a magnetic record disk or an optical record disk, and a tuning circuit which tunes a digital image signal and outputs it, which supply display information to the display-information processing circuits 152A and 152B in the form of an image signal of a predetermined format etc. in response to various clock signals generated by the timing generators 154A and 154B, respectively.

The display-information processing circuits 152A and 152B have various known circuits including a serial-parallel conversion circuit, an amplification/inversion circuit, a rotation circuit, a gamma correction circuit, and a clamp circuit, whereby process input display information, and supply the image information together with a clock signal CLK to the drive circuits 103A and 103B, respectively. The drive circuits 103A and 103B include a scanning-line drive circuit, a data-line drive circuit, and an inspection circuit. The power supply circuits 153A and 153B each supply the above-mentioned components with predetermined voltage.

The light sources (LEDs) 62 are connected to the third control circuit 170. The third control circuit 170 includes a determination circuit 171, a brightness measurement circuit 172, and a current supply circuit 173.

The first receiver circuit 11A and the second receiver circuit 11B include a photodiode and a phototransistor, for example. The first receiver circuit 11A receives ambient light (light outside the electrooptic device) which passes through the device substrate 20A and enters the image display region of the first panel 10A. The second receiver circuit 11B receives ambient light which enters the image display region of the second panel 10B. The receiver circuits 11A and 11B receive ambient light with the respective receiving surfaces when a measurement start signal is sent from the third control circuit 170, converts the light into an electric signal by photoelectric conversion, and outputs the electric signal to the third control circuit 170 as luminance information.

The determination circuit 171 transmits a measurement start signal for receiving ambient light to the receiver circuits 11A and 11B every predetermined time, receives luminance information from the receiver circuits 11A and 11B, and calculates the luminances of the ambient lights from the received luminance information. The determination circuit 171 includes a recording section (not shown), such as a memory, on which the luminances of ambient lights measured by the receiver circuits 11A and 11B when it sent a measurement start signal in the past are recorded, and calculates the variation of the luminances of the ambient lights measured by the receiver circuits 11A and 11B and the direction of the variation.

The determination circuit 171 compares the luminance of the first ambient light measured by the first receiver circuit 11A, and that of the second ambient light measured by the second receiver circuit 11B. When the directions of the variation of the luminances are different from each other, the determination circuit 171 calculates the ratio of the luminance of the first ambient light to that of the second ambient light. When the ratio is at or below a predetermined value (10 to 1 or less, for example), the determination circuit 171 determines that the ambient lights are measured at a position where the second panel 10B is against the first ambient light, e.g., just under a fluorescent light.

Figure 3:
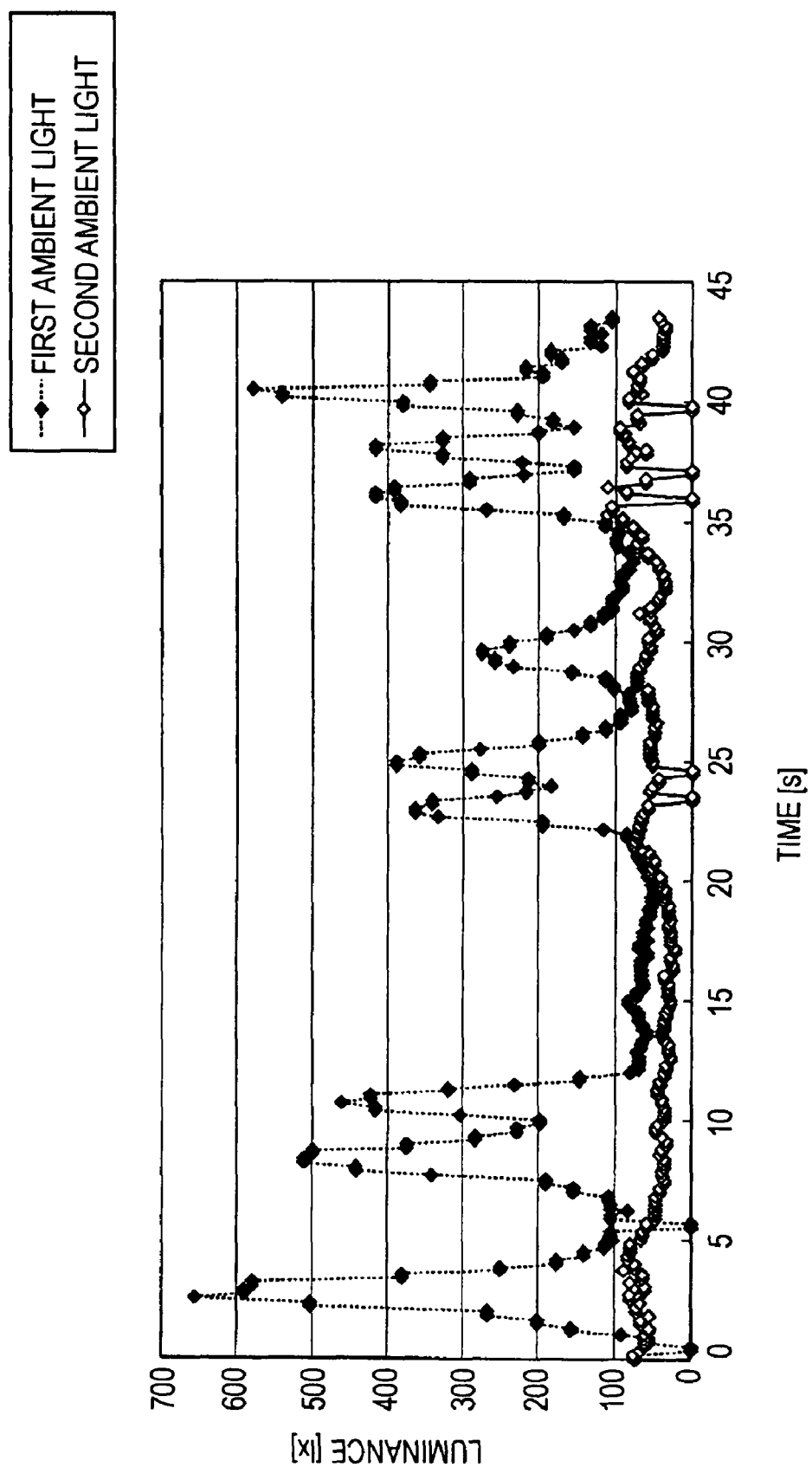
FIG. 3 is a diagram showing an example of the luminances of ambient lights measured by the first receiver circuit and the second receiver circuit.

FIG. 3 shows an example of the luminances of ambient lights measured by the first receiver circuit 11A and the second receiver circuit 11B in time sequence. This is the data of ambient lights measured by the receiver circuits 11A and 11B when the user walks along an indoor passage while displaying the first panel 10A. Two or more fluorescent lights which are lighting systems are arranged along the passage.

As shown in FIG. 3, the luminances of the ambient lights (the first ambient light and the second ambient light) measured by the receiver circuits 11A and 11B increase and decrease periodically in accordance with the arrangement of the fluorescent lights. When the first panel 10A is located except just under a fluorescent light, ambient light reflected by the ground enters the second receiver circuit 11B. Accordingly, the luminance of the second ambient light does not become extremely lower than that of the luminance of the first ambient light. At a position near the fluorescent light, the luminance of reflected light from the ground will also become high. Accordingly, the luminance of the first ambient light (luminance of light which enters directly from a fluorescent light) and the luminance of the second ambient light (luminance of reflected light) will show changes almost in the same direction.

Since little light reflected by the ground enters when the first panel 10A is located just under a fluorescent light, the luminance of the second ambient light becomes extremely lower than that of the first ambient light. Referring to FIG. 3, peaks of the second ambient light measured at 0 sec, 5 sec, 23 sec, 25 sec, 36 sec, 37 sec, and 40 sec shows this. Although the luminance of the second ambient light increases gradually until the first panel 10A approaches a fluorescent light, the luminance of the second ambient light decreases when it comes just under a fluorescent light. This shows a reverse change to that of the first ambient light. Furthermore, the luminance of the second ambient light may decrease rapidly to about zero. Accordingly, when such a discontinuous change is detected, it can be determined that the second panel 10B is in a position against a fluorescent light.

The determination circuit 171 outputs the data of the luminance of the first ambient light recorded on the recording section to the brightness measurement circuit 172. At that time, the data of the luminance of the first ambient light that is determined to have been measured in a position where the second panel 10B is against the first ambient light is excluded, and the other data of the luminance of the first ambient light is output. This is because the luminance of the first ambient light also increases discontinuously in a position where the second panel 10B is against ambient light, so that environmental brightness calculated from such data results in brightness higher than that of environment which humans sense.

The brightness measurement circuit 172 calculates the average value of the luminance of the first ambient light on the basis of the data of the luminance of the first ambient light output from the determination circuit 171, and determines this average value to be environmental brightness. The brightness measurement circuit 172 includes a storage section for storing the data of the luminance of the first ambient light output from the determination circuit 171. The brightness measurement circuit 172 calculates the average value of the luminance of the first ambient light from the data stored in the storage section (for example, data of the luminance of the first ambient light measured in 10 seconds). The brightness measurement circuit 172 outputs information on environmental brightness measured in this way to the current supply circuit 173. In this embodiment, "the average value of the luminance of the first ambient light" is calculated as environmental brightness. Alternatively, the mode of the luminance of the first ambient light may be measured as environmental brightness.

The current supply circuit 173 adjusts the current to be supplied to the light sources (LEDs) 62 on the basis of the environmental brightness measured by the brightness measurement circuit 172 to control the luminance of the illumination light. The current supply circuit 173 may have a structure in which when environmental brightness is at or below a threshold, the light sources 62 emits light to bring the first panel 10A into a transparent display mode, and when it is higher than the threshold, the light emission of the light sources (LEDs) 62 is stopped to bring the first panel 10A into a reflective display mode.

The main controller 160 sends a lighting on/off instruction, the original data of display information, etc. to the display-information output sources 151A and 151B of the control circuits 150A and 150B as appropriate to make the display-information output sources 151A and 151B output corresponding display information, thereby causing the first panel 10A and the second panel 10B to display an appropriate image via the control circuits 150A and 150B and the drive circuits 103A and 103B, respectively. The main controller 160 sends an instruction to transmit a measurement start signal etc. to the determination circuit 171 of the third control circuit 170 to control the lighting on/off, etc. of the light sources 62.

Method for Controlling Back Light Unit

Figure 4:
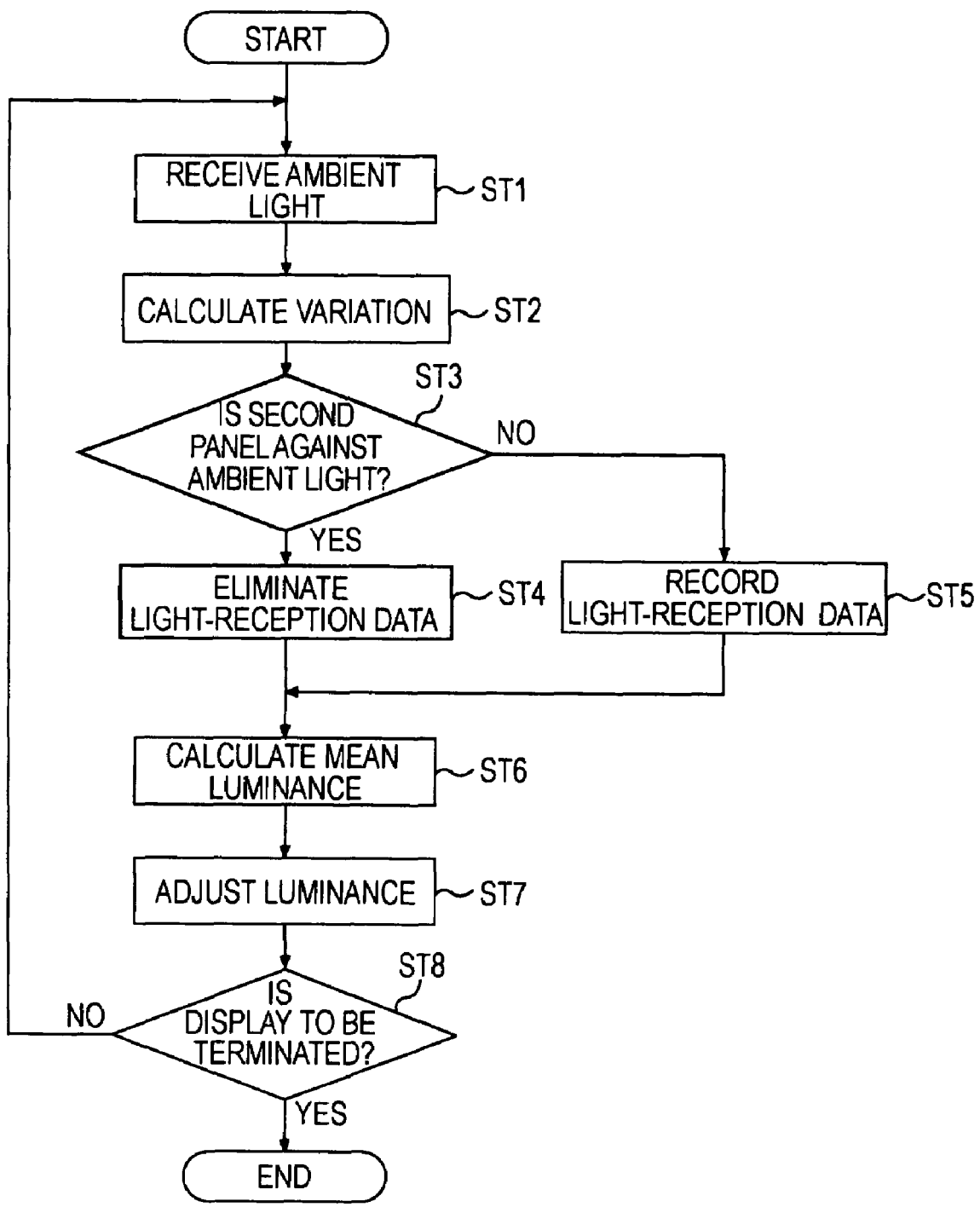
FIG. 4 is a flowchart for a method for controlling the luminance of the illumination light of a back light unit.

FIG. 4 is a diagram showing a method for controlling the luminance of the illumination light of the back light unit 6 relative to the luminance of ambient light. As shown in FIG. 4, first, the determination circuit 171 sends a measurement start signal to the receiver circuits 11A and 11B, and the receiver circuits 11A and 11B receive ambient light, respectively (Step ST1). The receiver circuits 11A and 11B output converted electric signals to the determination circuit 171 as luminance information.

Next, the determination circuit 171 calculates the luminance of the ambient light and the variation of the luminance from the received luminance information, and records it on the above-mentioned recording section (step ST2). The direction of the variation of the luminance of the ambient light is calculated from the luminance information. When the direction is different between the first ambient light and the second ambient light, the determination circuit 117 calculates the ratio of the luminance of the first ambient light to that of the second ambient light to thereby determine whether the second panel is against the first ambient light (step ST3). When the ratio is 10 to 1 or less, it determines that the second panel 10B is against the light, and excludes the data from the data of the luminance of the first ambient light to be outputted to the brightness measurement circuit 172 (step ST4). On the other hand, when the ratio is smaller than 10 to 1, it determines that the second panel 10B is not against the light, and outputs the data of the first ambient light to the brightness measurement circuit 172 (step ST5).

Next, the brightness measurement circuit 172 calculates the average value of the luminance of the first ambient light output from the determination circuit 171, and outputs it to the current supply circuit 173 (step ST6). The current supply circuit 173 adjusts the current to be supplied to the light sources 62 at levels, for example, at three levels or more on the basis of the average value of the luminance of the first ambient light (step ST7). Here, when the average value of the luminance of the first ambient light is within the range from 100 lux to 1,000 lux, the current supply circuit 173 adjusts the current at two or more levels, and performs finer control to the environmental brightness.

After adjusting the luminance of illumination light in step ST7, it is determined whether to continue the display of an image by the electrooptic device 1 (step ST8). In step ST8, when the display of an image by the electrooptic device 1 is to be continued, the process returns to step ST1 after a lapse of predetermined time, where the luminance of ambient light is again measured by sending a measurement start signal by the determination circuit 171. On the other hand, in step ST8, when the display of an image by the electrooptic device 1 is finished, the emission of illumination light is finished. The luminance of illumination light of the back light unit 6 is controlled in that way.

As described above, the electrooptic device 1 of the embodiment grasps the positional relationship between the first panel 10A and ambient light (a fluorescent light) using both the first receiver circuit 11A and the second receiver circuit 11B, with which it suitably selects the data of ambient light which should be excluded. Therefore, the use of the electrooptic device 1 allows measurement of the brightness of environment closer to human perception than that by the known devices. Since the electrooptic device 1 controls the display state of an image finely on the basis of the brightness of environment measured in this way, it can provide an image with higher visibility and lower power consumption than known devices.

In this embodiment, the display state of an image is controlled by adjusting the luminance of the illumination light of the back light unit 6. However, the method for controlling the display state of an image is not necessarily limited to that. For example, the display state of an image may be controlled by controlling the gray level of the image according to environmental brightness. Although a nonluminescent liquid crystal panel is used as the first panel 10A and the second panel 10B in this embodiment, a selfluminous panel, such as an organic electroluminescence (EL) panel, may be used. In this case, since no back light unit is needed, the display state of an image will be controlled by the gray level (the amount of luminescence) etc. of the image. Although the embodiment shows an example in which the first receiver circuit 11A and the second receiver circuit 11B are disposed on the substrates of the first panel and the second panel of the electrooptic device 1, the arrangement position is not necessarily limited to that. The first receiver circuit 11A and the second receiver circuit 11B are not necessarily disposed on the substrate provided that they are on the positions where opposing ambient light can be detected.

Although the organic electroluminescence device does not necessarily use the electrooptic effect, the electrooptic device of the invention includes not only a device that uses such an electrooptic effect but also general devices that can control the display state by electrical effects. That is, the electrooptic device of the invention generally includes a device that has an electrooptic effect that the transmittance of light changes as the refractive index of a substance changes by an electric field and a device that converts electric energy to optical energy. Specifically, examples of the electrooptic device include a liquid crystal device using liquid crystal as an electrooptic substance, an organic EL device using organic EL, an inorganic EL device using inorganic EL, and a plasma display device using gas for plasma. Examples further include an electrophoretic display (EPD), a field emission display (FED).

Electronic Device

Figure 5A:
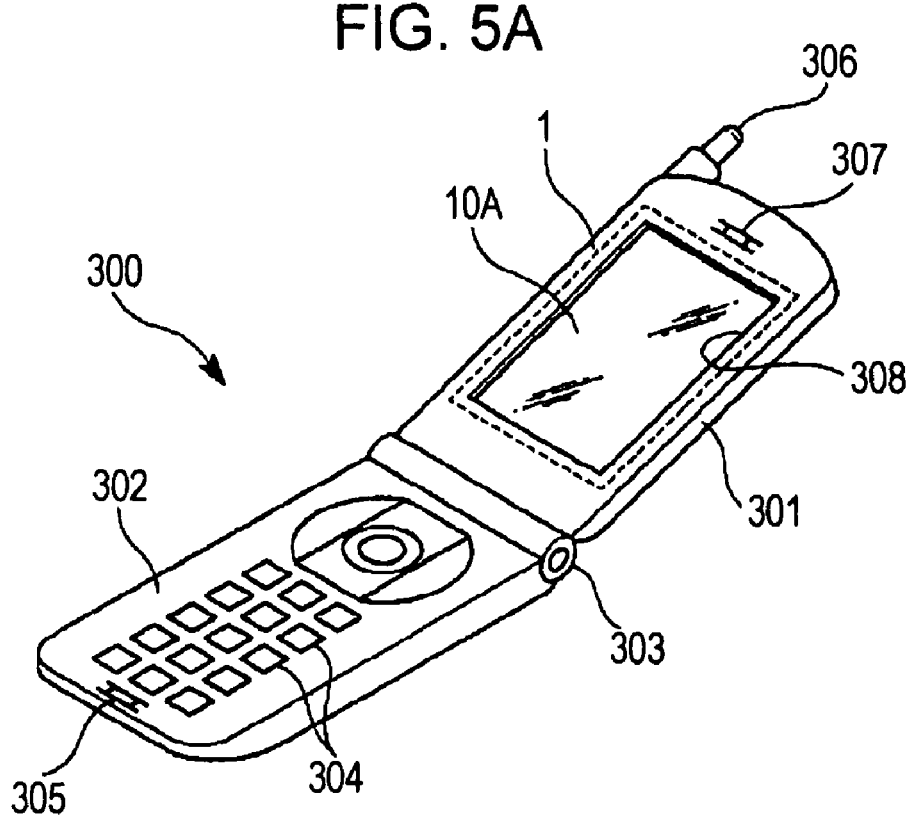
FIG. 5A is a perspective view of a mobile phone which is an example of an electronic device having this electrooptic device.
Figure 5B:
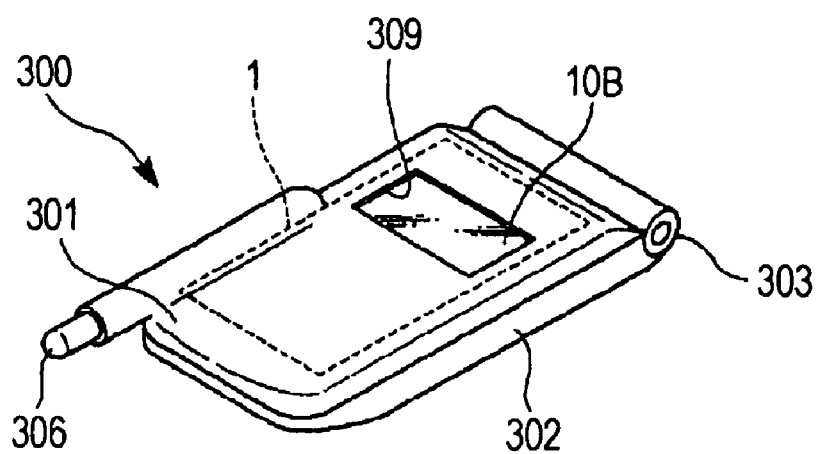
FIG. 5B is a perspective view of the mobile phone in the folded state.

Hereafter, an electronic device equipped with the electrooptic device 1 of the embodiment will be described. FIGS. 5A and 5B are schematic diagrams of a mobile phone, denoted by 300, which is an example of the electronic device. This mobile phone 300 is a folding mobile phone which has a first case 301 and a second case 302. The first case 301 and the second case 302 are connected by a hinge 303 at the rims. The user can fold the electronic device 300 so that the first case 301 and the second case 302 are opposed to each other (into the closed state), as shown in FIG. 5B, by rotating the first case 301 toward the second case 302 about the hinge 302 from the state in which the first case 301 is open about 180 degrees to the second case 302, as shown in FIG. 5A.

The surface of the second case 302 which faces the first case 301 in the closed state has a plurality of operators 304 for the user and a microphone 305 for the user to input voices. On the other hand, the first case 301 accommodates an antenna 306 for wireless communications and a speaker 307 for outputting voices, and also the liquid crystal device 1 (electrooptic device) of the embodiment as an image display section. The liquid crystal device 1 has the main first panel 10A and the second subpanel 10B. The first panel 10A and the second panel 10B are display panels for displaying various images. The surface of the first case 301 which faces the second case 302 in the closed state has an opening 308. As shown in FIG. 5A, the first panel 10A is disposed so that the display surface is located inside the opening 308. On the other hand, the surface of the first case 301 opposite to the opening 308 has an opening 309, as shown in FIG. 5B. The second panel 10B is disposed so that the display surface is located inside the opening 309. The user can view an image displayed on the first panel 10A through the opening 308, and an image displayed on the second panel 10B through the opening 309.

The electronic device shown in FIGS. 5A and 5B includes an image display section which uses the liquid crystal device 1 of the embodiment. Accordingly, the electronic device can particularly measure the brightness of indoor environment illuminated by a fluorescent light, thereby controlling the display state of an image appropriately.

The electrooptic device of the invention can be mounted not only to the above-described mobile phone but to various electronic devices. Examples of the electronic devices include electronic books, personal computers, digital still cameras, liquid crystal televisions, viewfinder or monitor-direct-view type videotape recorders, car navigation systems, pagers, electronic notebooks, calculators, word processors, workstations, TV phones, POS terminals, and devices having a touch panel. The electrooptic device can be conveniently used as these image display means.

Second Embodiment

Overall Structure of Electrooptic Device

Figure 6:
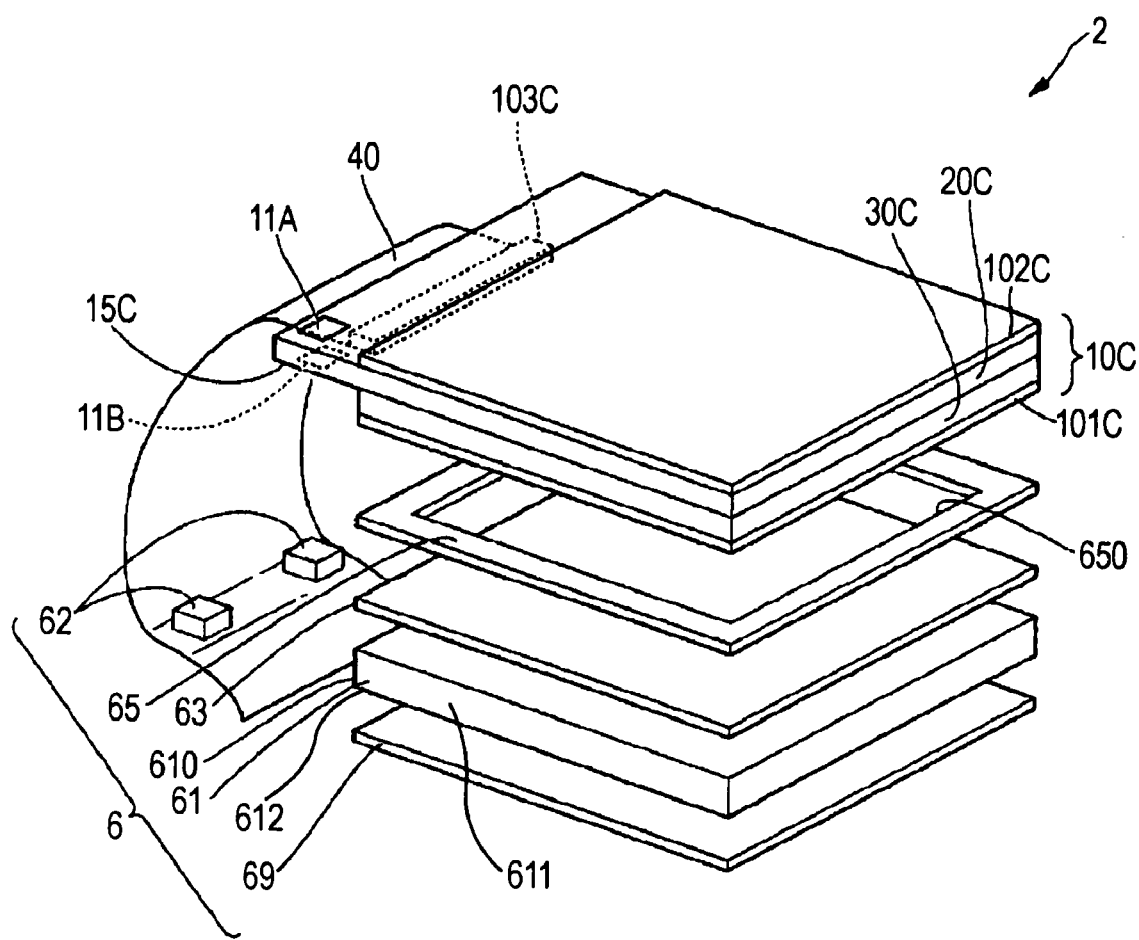
FIG. 6 is an exploded perspective view showing the structure of an electrooptic device according to a second embodiment of the invention.

FIG. 6 is an exploded perspective view showing the structure of an electrooptic device 2 according to a second embodiment of the invention. As shown in FIG. 6, the electrooptic device 2 of this embodiment includes a display panel 10C and a back light unit 6 which is a lighting system provided on the back (opposite to the display surface) of the display panel 10C. In FIG. 6, the components common to those of the electrooptic device 1 shown in FIG. 1 are given the same reference numerals, and detailed explanation is omitted.

The display panel 10C is an active-matrix transmissive or transflective electrochromatic liquid crystal display panel formed of nematic liquid crystal, such as a nonluminescent panel, for example. A light-incident side polarizer 101C and a light-exiting side polarizer 102C are laminated on both sides of the display panel 10C.

The display panel 10C includes a device substrate 20C having picture electrodes and TFT elements which are pixel switching elements, and an opposed substrate 30C having opposed electrodes, a color filter, etc. These substrates 20C and 30C are bonded together with a sealing material with a predetermined gap, between which a liquid crystal layer is enclosed. The device substrate 20C is larger than the opposed substrate 30C. An overhanging area 15C of the device substrate 20C projects out of the opposed substrate 30C, on which a drive circuit 103C including a semiconductor IC etc. is mounted by a chip on glass (COG) technique. The second receiver circuit 11B which is a photosensor is provided near the drive circuit 103C. The first receiver circuit 11A which is a photosensor is disposed on the display surface of the device substrate 20C opposite to the second receiver circuit 11B (the surface of the device substrate 20C opposite to the back light unit 6). A rim of the flexible board 40 which transfers signals or power between the drive circuit 103A and the receiver circuits 11A and 11B is mounted to the overhanging area 15C.

The display panel 10C is opposed to the first surface 611 of the light guide 61 of the back light unit 6. The display panel 10C is illuminated with the illumination light exiting from the light guide 61 to the first surface 611.

The back light unit 6 includes a plurality of LEDs 62 (light emitting elements) serving as light source, and the light guide 61. The light emitted from the LEDs 62 enters the light guide 61 through a side face 610 and exits from the first surface 611 and the second surface 612.

The light guide 61 is made of a light transmissive resin molding. A prism sheet 63 with a thickness of, e.g., 100 μm is opposed to the first surface 611 of the light guide 61. Between the prism sheet 63 and the display panel 10C, a light-shielding sheet 65 which has an opening 650 in a region corresponding to the image display region of the display panel 10C is stacked. Similarly, a reflecting sheet 69 is opposed to the second surface 612 of the light guide 61.

The prism sheet 63 allows part of the light exiting from the first surface 611 of the light guide 61 to pass through to the display panel 10C, and reflects the remaining light toward the light guide 61. The reflecting sheet 69 reflects the light exiting from the second surface 612 of the light guide 61 to the light guide 61. The light-shielding sheets 65 and 66 prevent a leak of light, which may be a two-layer sheet of black and white, a two-layer sheet of silver and black, a white sheet, or a transparent sheet, and which have a thickness of 50 μm, for example. The image display region is for displaying an image to a user, which is specified by the frame window of an electronic device and which substantially overlaps with the regions specified by the opening 650.

The LEDs 62 are mounted on the flexible board 40 (light-emitting-element mounting board) for supplying signals and power to the display panel 10C. The flexible board 40 is taken from the display panel 10C to the second surface 612 of the light guide 61, where the part next to the region where the LEDs 62 are mounted is pressure-fixed to an end of the second surface 612 by a board fixing member (not shown). The rim of the flexible board 40 is fixed onto the second surface 612 and as such, the LEDs 62 are positioned with the optical axis L directed to the side face 610 of the light guide 61.

Display Operation of Electrooptic Device

In the electrooptic device 2, the light emitted from the LEDs 62 enters the light guide 61 through the side face 610, and advances to the opposite side face. Since the reflecting sheet 69 is disposed on the second surface 612 of the light guide 61, the light which advances in the light guide 61 is reflected by the reflecting sheet 69, passes through the prism sheet 63, and exits from the first surface 611 to the display panel 10C. The light is modulated while passing through the display panel 10C to form an image.

The display state of the display panel 10C is controlled by a main controller to be described later, for example. That is, when displaying by the display panel 10C, the luminance of the illumination light of the back light unit 6 is controlled on the basis of the brightness of environment measured by the first receiver circuit 11A, thereby achieving a display state suitable for the brightness of the environment where the display panel 10C is placed.

Electrical Structure of Electrooptic Device

Figure 7:
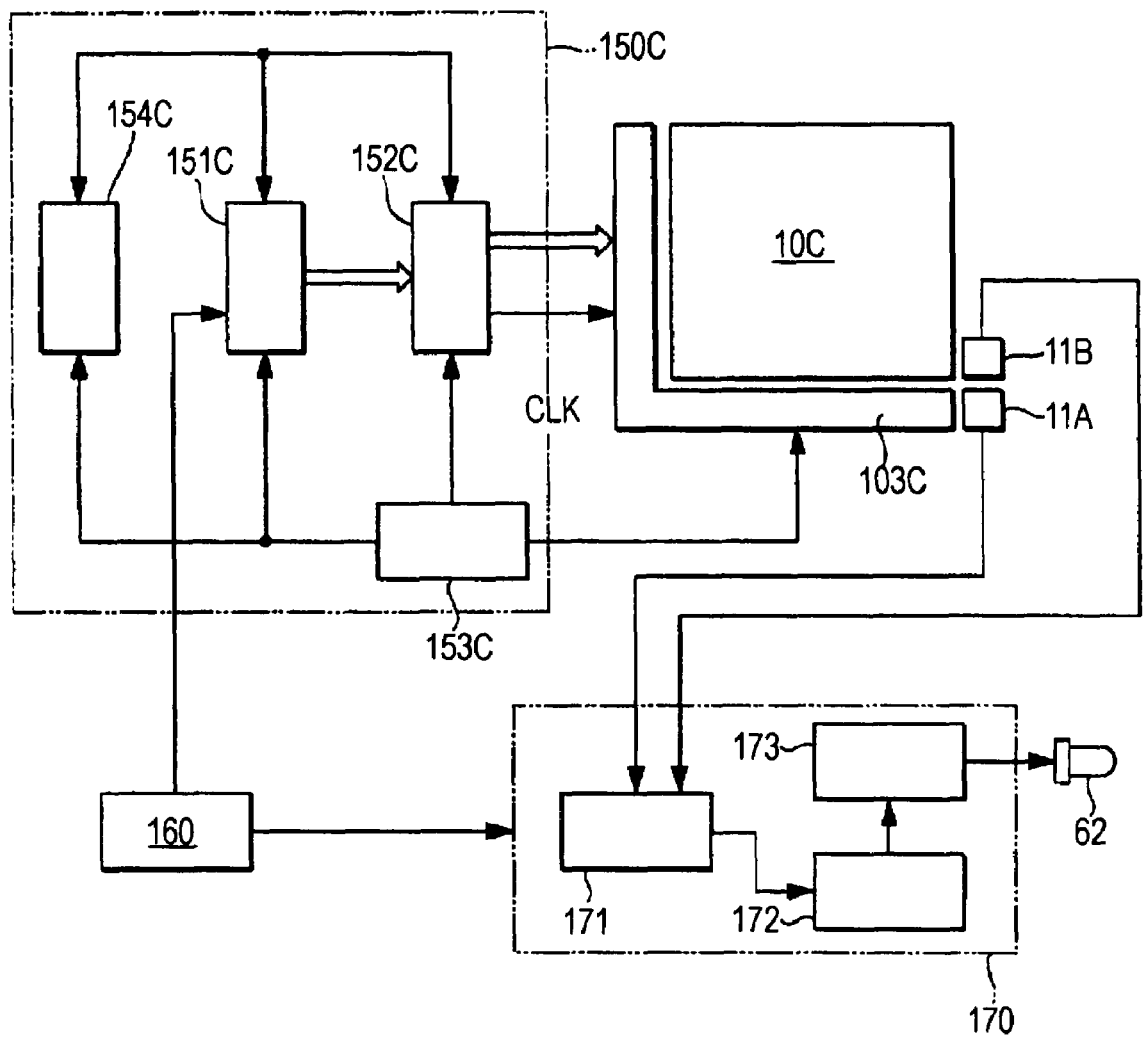
FIG. 7 is a block diagram showing the electrical structure of the electrooptic device.

FIG. 7 is a block diagram showing the electrical structure of the electrooptic device 2. As shown in FIG. 7, the electrooptic device 2 includes a control circuit 150C which controls the display panel 10C, a control circuit 170 which controls the light sources (LEDs) 62, the first receiver circuit 11A which detects an ambient light (first ambient light) incident on display surface of the display panel 10C, and the second receiver circuit 11B which detects an ambient light (second ambient light) incident on the surface of the display panel 10C opposite to the display surface. The control circuit 150C and the control circuit 170 are controlled by the main controller 160 configured of a microcomputer etc.

The display panel 10C is connected to the drive circuit 103C. The drive circuit 103C is connected to the control circuit 150C. The control circuit 150C includes a display-information output source 151C, a display-information processing circuit 152C, a power supply circuit 153C, and a timing generator 154C.

The display-information output source 151C includes a memory such as a ROM or a RAM, a storage unit such as a magnetic record disk or an optical record disk, and a tuning circuit which tunes a digital image signal and outputs it, which supply display information to the display-information processing circuit 152C in the form of an image signal of a predetermined format etc. in response to various clock signals generated by the timing generator 154C.

The display-information processing circuit 152C has various known circuits including a serial-parallel conversion circuit, an amplification/inversion circuit, a rotation circuit, a gamma correction circuit, and a clamp circuit, whereby processes input display information, and supplies the image information together with a clock signal CLK to the drive circuit 103C. The drive circuit 103C includes a scanning-line drive circuit, a data-line drive circuit, and an inspection circuit. The power supply circuit 153C supplies the above-mentioned components with predetermined voltage.

The light sources (LEDs) 62 are connected to the control circuit 170. The control circuit 170 includes a determination circuit 171, a brightness measurement circuit 172, and a current supply circuit 173.

The first receiver circuit 11A and the second receiver circuit 11B include a photodiode and a phototransistor, for example. The first receiver circuit 11A receives ambient light (light outside the electrooptic device) incident on the image display surface of the display panel 10C. The second receiver circuit 11B receives ambient light incident on the surface of the display panel 10C opposite to the display surface. The receiver circuits 11A and 11B receive ambient light with the respective receiving surfaces when a measurement start signal is sent from the control circuit 170, converts the light into an electric signal by photoelectric conversion, and outputs the electric signal to the control circuit 170 as luminance information.

The determination circuit 171 transmits a measurement start signal for receiving ambient light to the receiver circuits 11A and 11B every predetermined time, receives luminance information from the receiver circuits 11A and 11B, and calculates the luminances of the ambient lights from the received luminance information. The determination circuit 171 includes a recording section (not shown), such as a memory, on which the luminances of ambient lights measured by the receiver circuits 11A and 11B when it sent a measurement start signal in the past are recorded, and calculates the variation of the luminances of the ambient lights measured by the receiver circuits 11A and 11B and the direction of the variation.

The determination circuit 171 compares the luminance of the first ambient light measured by the first receiver circuit 11A, and that of the second ambient light measured by the second receiver circuit 11B. When the directions of the variation of the luminances are different from each other, the determination circuit 171 calculates the ratio of the luminance of the first ambient light to that of the second ambient light. When the ratio is at or below a predetermined value (10 to 1 or less, for example), the determination circuit 171 determines that the ambient lights are measured at a position where the back of the display panel 10C including the second receiver circuit 11B is against the first ambient light, e.g., just under a fluorescent light.

The determination circuit 171 outputs the data of the luminance of the first ambient light recorded on the recording section to the brightness measurement circuit 172. At that time, the data of the luminance of the first ambient light that is determined to have been measured in a position where the second receiver circuit 11B (the back of the display panel 10C) is against the first ambient light is excluded, and the other data of the luminance of the first ambient light is output. This is because the luminance of the first ambient light also increases discontinuously in a position where the second receiver circuit 11B is against ambient light, so that environmental brightness calculated from such data results in brightness higher than that of environment which humans sense.

The brightness measurement circuit 172 calculates the average value of the luminance of the first ambient light on the basis of the data of the luminance of the first ambient light output from the determination circuit 171, and determines this average value to be environmental brightness. The brightness measurement circuit 172 includes a storage section for storing the data of the luminance of the first ambient light output from the determination circuit 171. The brightness measurement circuit 172 calculates the average value of the luminance of the first ambient light from the data stored in the storage section (for example, data of the luminance of the first ambient light measured in 10 seconds). The brightness measurement circuit 172 outputs information on environmental brightness measured in this way to the current supply circuit 173. In this embodiment, "the average value of the luminance of the first ambient light" is calculated as environmental brightness. Alternatively, the mode of the luminance of the first ambient light may be measured as environmental brightness.

The current supply circuit 173 adjusts the current to be supplied to the light sources (LEDs) 62 on the basis of the environmental brightness measured by the brightness measurement circuit 172 to control the luminance of the illumination light. The current supply circuit 173 may have a structure in which when environmental brightness is at or below a threshold, the light sources 62 emits light to bring the display panel 10C into a transparent display mode, and when it is higher than the threshold, the light emission of the light sources (LEDs) 62 is stopped to bring the display panel 10C into a reflective display mode.

The main controller 160 sends a lighting on/off instruction, the original data of display information, etc. to the display-information output source 151C of the control circuit 150C as appropriate to make the display-information output source 151C output corresponding display information, thereby causing the display panel 10C to display an appropriate image via the control circuit 150C and the drive circuit 103C. The main controller 160 sends an instruction to transmit a measurement start signal etc. to the determination circuit 171 of the control circuit 170 to control the lighting on/off, etc. of the light sources 62.

As described above, the electrooptic device 2 of the embodiment grasps the positional relationship between the display panel 10C and ambient light (a fluorescent light) using both the first receiver circuit 11A and the second receiver circuit 11B, with which it suitably selects the data of ambient light which should be excluded. Therefore, the use of the electrooptic device 2 allows measurement of the brightness of environment closer to human perception than that by the known devices. Since the electrooptic device 2 controls the display state of an image finely on the basis of the brightness of environment measured in this way, it can provide an image with higher visibility and lower power consumption than known devices.

In this embodiment, the display state of an image is controlled by adjusting the luminance of the illumination light of the back light unit 6. However, the method for controlling the display state of an image is not necessarily limited to that. For example, the display state of an image may be controlled by controlling the gray level of the image according to environmental brightness. Although a nonluminescent liquid crystal panel is used as the display panel 10C in this embodiment, a selfluminous panel, such as an organic electroluminescence (EL) panel, may be used. In this case, since no back light unit is needed, the display state of an image will be controlled by the gray level (the amount of luminescence) etc. of the image. Although the embodiment shows an example in which the first receiver circuit 11A and the second receiver circuit 11B are disposed on the substrate of the display panel 10C of the electrooptic device 2, the arrangement position is not necessarily limited to that. The first receiver circuit 11A and the second receiver circuit 11B are not necessarily disposed on the substrate provided that they are on the positions where opposing ambient light can be detected.

Electronic Device

Figure 8A:
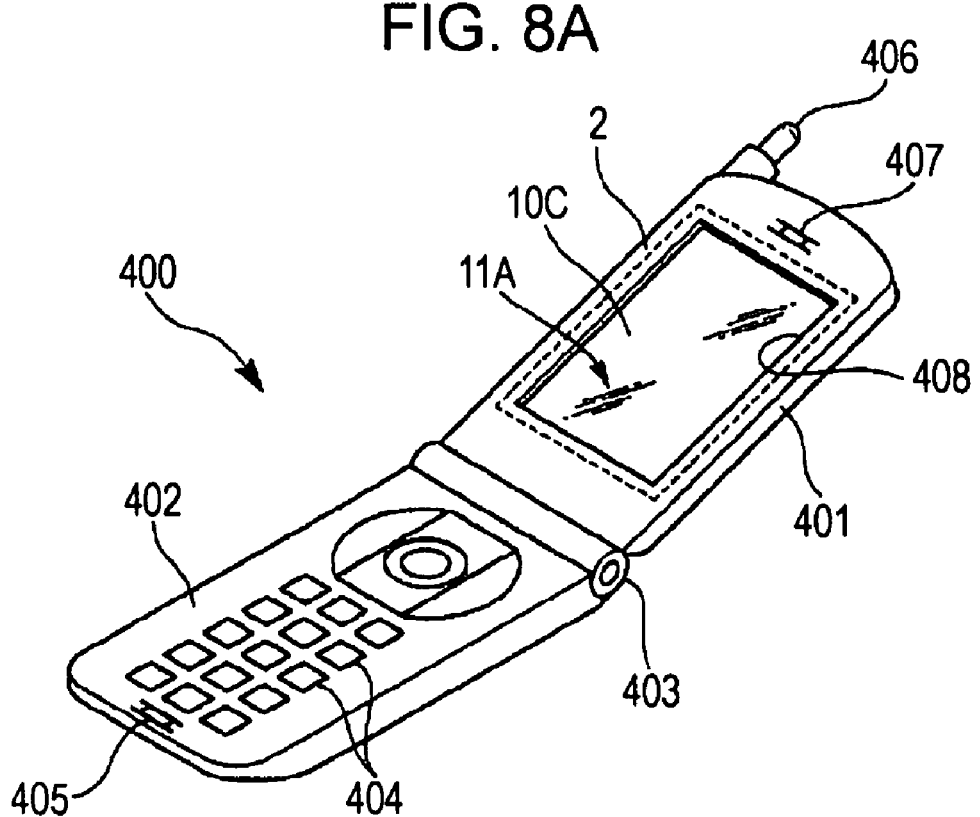
FIG. 8A is a perspective view of a mobile phone which is an example of an electronic device having the electrooptic device.
Figure 8B:
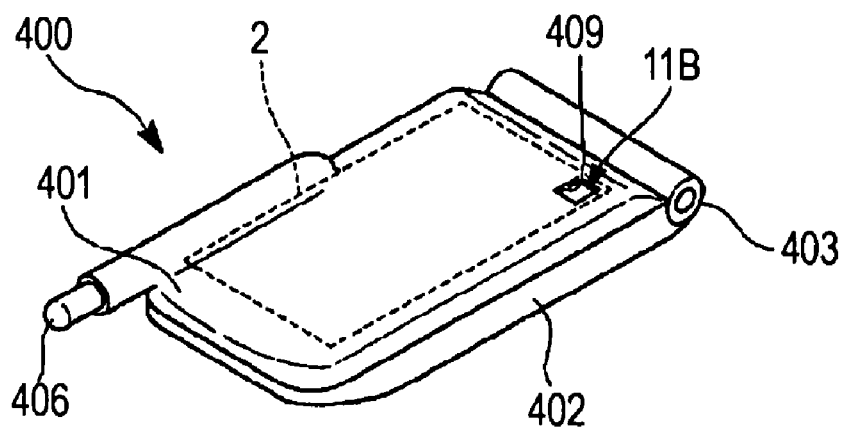
FIG. 8B is a perspective view of the mobile phone in the folded state.

Hereafter, an electronic device equipped with the electrooptic device 2 of the embodiment will be described. FIGS. 8A and 8B are schematic diagrams of a mobile phone, denoted by 400, which is an example of the electronic device. This mobile phone 400 is a folding mobile phone which has a first case 401 and a second case 402. The first case 401 and the second case 402 are connected by a hinge 403 at the rims. The user can fold the electronic device 400 so that the first case 401 and the second case 402 are opposed to each other (into the closed state), as shown in FIG. 8B, by rotating the first case 401 toward the second case 402 about the hinge 402 from the state in which the first case 401 is open about 180 degrees to the second case 402, as shown in FIG. 8A.

The surface of the second case 402 which faces the first case 401 in the closed state has a plurality of operators 404 for the user and a microphone 405 for the user to input voices. On the other hand, the first case 401 accommodates an antenna 406 for wireless communications and a speaker 407 for outputting voices, and also the liquid crystal device 2 (electrooptic device) of the embodiment as an image display section. The surface of the first case 401 which faces the second case 402 in the closed state has an opening 408. As shown in FIG. 8A, the display panel 10C is disposed so that the display surface and the first receiver circuit 11A are located inside the opening 408. On the other hand, the surface of the first case 401 opposite to the opening 408 has an opening 409, as shown in FIG. 8B. The second receiver circuit 11B opposite to the display surface of the display panel 10C is disposed inside the opening 409. The user can view an image displayed on the display panel 10C through the opening 408. Moreover, on the back of the display panel 10C, the luminance of the back light can be controlled on the basis of the ambient light received by the second receiver circuit 11B through the opening 409.

The electronic device shown in FIGS. 8A and 8B includes an image display section which uses the liquid crystal device 2 of the embodiment. Accordingly, the electronic device can particularly measure the brightness of indoor environment illuminated by a fluorescent light, thereby controlling the display state of an image appropriately.

Preferred embodiments of the invention have been described with reference to the accompanying drawings.

However, it is obvious to those skilled in the art that the invention is not limited to those embodiments, and that the shapes, combinations, etc. of the components shown in the embodiments are merely examples, and can be variously changed according to a design requirement etc. without departing from the scope and spirit of the invention.

What is claimed is:

1. An electrooptic device comprising:
a first panel;
a second panel on a back of the first panel;
a first receiver circuit that measures a first ambient light incident on the first panel;
a second receiver circuit that measures a second ambient light incident on the second panel; and
a control circuit that measures a brightness of an environment where the first panel is placed based on a luminance of the first ambient light whose ratio to that of the second ambient light is at or below a predetermined value, and that controls a display state of an image displayed on the first panel based on the brightness of the environment, wherein the predetermined value is 10 to 1.

2. An electrooptic device comprising:
a display panel having a predetermined display surface;
a first receiver circuit that measures a first ambient light incident on the display surface of the display panel;
a second receiver circuit that measures a second ambient light incident on a surface of the display panel opposite to the display surface; and
a control circuit that measures a brightness of an environment where the display panel is placed based on a luminance of the first ambient light whose ratio to that of the second ambient light is at or below a predetermined value, and that controls a display state of an image displayed on the display panel based on the brightness of the environment, wherein the predetermined value is 10 to 1.

3. The electrooptic device according to claim 1, wherein the control circuit controls the display state of the image at three levels or more according to the brightness of the environment.

4. The electrooptic device according to claim 3, wherein the control circuit controls the display state of the image at two levels or more in the range from 100 lux to 1,000 lux.

5. The electrooptic device according to claim 1, comprising:
a lighting system that emits illumination light from an opposite side of a display surface,
wherein the control circuit controls a luminance of the illumination light based on the brightness of the environment.

6. The electrooptic device according to claim 1, wherein the control circuit controls a gray level of the image based on the brightness of the environment.

7. An electronic device comprising the electrooptic device according to claim 1.

8. The electrooptic device according to claim 2, wherein the control circuit controls the display state of the image at three levels or more according to the brightness of the environment.

9. The electrooptic device according to claim 8, wherein the control circuit controls the display state of the image at two levels or more in the range from 100 lux to 1,000 lux.

10. The electrooptic device according to claim 2, comprising
a lighting system that emits illumination light from an opposite side of the display surface,
wherein the control circuit controls a luminance of the illumination light based on the brightness of the environment.

11. The electrooptic device according to claim 2, wherein the control circuit controls a gray level of the image based on the brightness of the environment.

12. An electronic device comprising the electrooptic device according to claim 2.

13. An electrooptic device comprising:
a first panel;
a second panel on a back of the first panel;
a first receiver circuit that measures a first ambient light incident on the first panel;
a second receiver circuit that measures a second ambient light incident on the second panel; and
a control circuit that measures a brightness of an environment where the first panel is placed based on a luminance of the first ambient light whose ratio to that of the second ambient light is at or below a predetermined value, and that controls a display state of an image displayed on the first panel based on the brightness of the environment, wherein the control circuit controls the display state of the image at three levels or more according to the brightness of the environment, and wherein the control circuit controls the display state of the image at two levels or more in the range from 100 lux to 1,000 lux.

14. An electronic device comprising the electrooptic device according to claim 13.

15. An electrooptic device comprising:
a display panel having a predetermined display surface;
a first receiver circuit that measures a first ambient light incident on the display surface of the display panel;
a second receiver circuit that measures a second ambient light incident on a surface of the display panel opposite to the display surface; and
a control circuit that measures a brightness of an environment where the display panel is placed based on a luminance of the first ambient light whose ratio to that of the second ambient light is at or below a predetermined value, and that controls a display state of an image displayed on the display panel based on the brightness of the environment, wherein the control circuit controls the display state of the image at three levels or more according to the brightness of the environment, and wherein the control circuit controls the display state of the image at two levels or more in the range from 100 lux to 1,000 lux.

16. An electronic device comprising the electrooptic device according to claim 15.

* * * * *